(12) United States Patent
Beauchamp

(10) Patent No.: US 6,886,011 B2
(45) Date of Patent: Apr. 26, 2005

(54) GOOD AND SERVICE DESCRIPTION SYSTEM AND METHOD

(75) Inventor: Jeffery O. Beauchamp, Houston, TX (US)

(73) Assignee: Datalign, Inc., Houston, TX (US)

( * ) Notice: Subject to any disclaimer, the term of this patent is extended or adjusted under 35 U.S.C. 154(b) by 780 days.

(21) Appl. No.: 09/776,469

(22) Filed: Feb. 2, 2001

(65) Prior Publication Data

US 2002/0107851 A1 Aug. 8, 2002

(51) Int. Cl.[7] .............................................. G06F 17/30
(52) U.S. Cl. .............................. 707/5; 707/3; 707/10; 707/101; 707/102; 707/103 R; 382/159; 704/3; 709/202
(58) Field of Search ........................... 382/159, 187; 704/3, 8, 9, 252, 277, 10, 20, 244, 258, 270; 705/1, 35, 26; 707/1, 4, 5, 10, 100, 102, 103 R, 3, 101; 709/203, 217, 225, 226, 228, 231, 202

(56) References Cited

U.S. PATENT DOCUMENTS

| | | | |
|---|---|---|---|
| 4,947,438 A | * | 8/1990 | Paeseler ...................... 704/252 |
| 4,951,196 A | | 8/1990 | Jackson |
| 5,371,807 A | * | 12/1994 | Register et al. ............. 382/159 |
| 5,500,793 A | | 3/1996 | Deming, Jr. et al. |
| 5,630,125 A | * | 5/1997 | Zellweger ............... 707/103 R |
| 5,758,126 A | | 5/1998 | Daniels et al. |
| 5,799,151 A | | 8/1998 | Hoffer |
| 5,799,284 A | | 8/1998 | Bourquin |
| 5,890,138 A | | 3/1999 | Godin et al. |
| 5,940,807 A | | 8/1999 | Purcell |
| 5,963,939 A | | 10/1999 | McCann et al. |
| 5,987,440 A | | 11/1999 | O'Neil et al. |
| 6,052,669 A | | 4/2000 | Smith et al. |
| 6,064,981 A | | 5/2000 | Barni et al. |
| 6,070,149 A | | 5/2000 | Tavor et al. |
| 6,081,789 A | | 6/2000 | Purcell |
| 6,131,085 A | * | 10/2000 | Rossides ........................ 705/1 |
| 6,412,008 B1 | * | 6/2002 | Fields et al. ................. 709/228 |

OTHER PUBLICATIONS

Hill, Neil C. and Ferguson Daniel M., Electronic Data Interchange: A Definition and Perspective, *ECOMWORLD*, http://www.ecomworld.com/html/articles/edij7_3.htm, Aug. 30, 2000.

* cited by examiner

*Primary Examiner*—Shahid Alam
*Assistant Examiner*—Fred I. Ehichioya
(74) *Attorney, Agent, or Firm*—Winstead Sechrest & Minick; Henry L. Ehrlich

(57) ABSTRACT

The present invention provides a system and method for the description of goods and services which permits the user to use an interactive system to automate the generation of descriptions of those goods or services for use, entry into a database or for query of a database. The invention comprises a dictionary database which provides associated lists. The lists may be of associated nouns, describing adjectives and modifying attributes from which to compose the description or specification. The lists may correspondingly represent services with verbs, adverbs and attributes. The invention may accept direct user input and attempts to automatically match the input to the unified dictionary database. The system may also display a list of possible elements from which the user may select. The invention then composes the description based upon user responses which may include the original user input and/or synonyms.

99 Claims, 8 Drawing Sheets

GOOD AND SERVICE DESCRIPTION SYSTEM AND METHOD

TECHNICAL FIELD

The instant invention relates in general to a system and method for describing goods and/or services within a computer database. More specifically, the instant invention is a system and method of database entry and record specification which permits a user to locate good and/or service entries stored within the database more efficiently.

BACKGROUND

The proliferation of computer networks, where several data processing systems are linked via data communication systems, has led to the decentralization of data entry and access. Many users often have access to common databases, which facilitates data entry by providing a parallel processing effect as each user on each data processing system adds a record simultaneously. Similarly, access to the database can be had by each user accessing the database simultaneously to query, print reports, and perform other read functions on the database.

Perhaps one of the largest examples of common database sharing exists in the context of (currently) the largest network: the Internet. The Internet is a global set of interconnected networks that operate based upon the packet-based Transmission Control Protocol/Internet Protocol ("TCP/IP"). Each data processing system, server or node, on the network has associated with it an address by which it can be accessed from another data processing system on the network. Under the IP addressing system, used by the Internet, addresses are comprised of four numbers between the values of zero and 255, each separated by a period, or "dot." For example, 169.255.255.0 is a valid TCP/IP address.

Since most users would be hard pressed to remember the IP addresses of all of the servers they wish to access, domain names were created to assist user-friendliness. A domain name is an alphanumeric designation which can be translated by a domain name server ("DNS") into an IP address. Domain names most frequently comprise two parts: a top level domain plus a second level domain name. The second level domain appears first and typically is some word or set of words that suggests to the user the data available at the address. The top level domain name is one of a set of defined designations which indicates what type of organization is sponsoring the data. For example, intuit.com is a domain name that suggests to the user that information regarding Intuit™'s products and services can be found, and that Intuit™ is likely a commercial venture. Likewise palm.net suggests that the Palm™ network can be accessed with that address.

Similarly, the provision of data processing system access on the Internet would leave most of the general public without access de facto because such data processing systems typically require the mastery of a set of commands which are far above the skill of most users. Accordingly, service facilities were developed so that high-level coding languages could be used to communicate with common users through a "browsing" interface.

The most popular of these service facilities is a collection of data files accessible by a browsing program and written in high-level languages such as the HyperText Markup Language ("HTML"). This service is commonly referred to in the art as the World Wide Web. HTML is a series of commands that are sent from a server data processing machine to a user's data processing machine. The user's data processing machine uses a software program called a "browser" to interpret the code to offer information to the user on the screen in a user-friendly format. The format includes areas of the screen which can be "clicked" with a pointing device, such as a mouse, to take the user to the next screen of information.

The use of browsing technology has become very sophisticated, to the point that users may now enter information, receive customized responses, perform complex searches, and fully access databases over the Internet. Other, more powerful languages have been introduced, such as JavaScript, JScript, Active Server Page ("ASP") which may act in conjunction with HTML to provide tremendous flexibility. As a result of these improvements, it is not uncommon for the general public to access and use common databases directly over the Internet. In fact, the Internet has become a common forum not only for the display of public information (as evidenced at http://www.uspto.gov), but also a forum through which to transact in goods and services.

Users, however, generally come from different backgrounds, cultures, and life experiences. Users are not trained on any common "preferred" methods of data entry; in fact such training on a global scale would be impossible. As a result, databases left to the public's entries often become very diverse and difficult to access. For example, when asked to input a user name, one person may enter "Joe Smith", another may enter "JOE SMITH". Yet another may enter "smith, joe", and so on. As a result, when one wishes to access the database to search for a user name, one cannot determine whether to look for data beginning with "smith" or "Joe" or "JOE" (or, indeed, "joe", or "jsmith", etc.).

In the context of user names, these issues are often solved by placing restrictions on users and dividing the data entry into various fields. However, there are a great number of applications where this approach is not used. One such application is the data entry of general goods descriptions or specifications, such as those on Internet auction and retail sites. Another such application relates to the specification of services offered on the Internet. Those services may be services rendered on-line (such as general services, payment services, etc.) or services rendered off-line (garage repair, local telephone service, long distance telephone service, etc.). A quick survey of Internet auction sites will reveal a myriad of ways to describe a single product or service. A wide variety of categorization schemes and classification systems are employed, frequently permitting a user to validly put a single good or service into multiple categories.

The differences in data entry are not limited to the ordering and capitalization of product names nor the mere selection of a particular category. What may be known to (and listed by) one person as "pants" may be listed by another as "slacks" or "trousers". To add confusion, a third person may list the same item as "pantalon" or "calças". More to the point: each entry may be completely correct.

As a direct result of the various modes of entering specifications of goods and services into the various databases used by various applications, those goods and services can be very difficult to locate. Someone entering a search specification looking for "pants," or even just anything beginning with "pant," will not receive results that include "slacks." Worse yet, such search results will be riddled with irrelevant results such as references to "pantry", "panther" and "pantomime". Accordingly, searching for goods and services on the Internet is presently very inefficient and can be very unproductive.

Technology providers of the day address the foregoing in one of two primary ways: Search engine improvements and categorization developments. The development of new search engines and improvements to them focuses on the way that things are organized and indexed, as well as what portions of the data are ultimately searched and how they are searched in order to achieve optimal results. Many of these improvements look towards providing the user faster results rather than providing the user the best results. Those few improvements that do focus on the best results generally do so by expanding the scope of their inquiry (providing thesaurus support, extra language support, etc.) or by obtaining additional information from the user (such as options to obtain additional results "like" a certain result).

Categorization attempts, even when they are mutually exclusive categories, often fail for incompleteness. Moreover, while categorization is moderately well adapted to finding an item within the database (providing one is familiar with the categorization scheme), placing that item in a database, it is not very well adapted. In other words, categorization functions much better when all of the qualities of the item are defined than when some of the qualities of the item are undefined. Even when a complete categorization is achieved, that categorization is best put to use by the user learning the categorization. Accordingly, there is a certain degree of training required for the user to acclimate to the system and become accustomed to the language used by the system. Such systems do not provide the user-friendly interface required for the general Internet.

As a result, both the search engine improvements and the categorization methods have failed to remedy the instant problems. In part, the failure of each technique is due to the fact that data entry is, by and large, uncontrolled. The ability to pull specific data from a database which is, by its nature, lacking in specificity, is a venture which is doomed to failure.

Accordingly, what is needed is a system and method for the systematic entry of specifications for goods and services. Such a system must be sufficiently flexible to permit the entry of the range of goods and services available in the world, be capable of adaptation to languages and cultural differences, and be simple enough for users to navigate. Such a system must not require training or memorization of a categorization, however it would be a benefit if such a system could be adapted to be compatible with existing categorization schemes. The system and method must yield consistent results. Such system and method must be operable to permit a user to efficiently define goods and services entered into a system and also be operable to permit a second user to locate those goods or services through a search criteria. It would further be advantageous for users to need only to become familiar with a single system for both submission and search.

SUMMARY

The present invention addresses the foregoing needs by providing a system and method for describing goods and services, both for submissions and for search queries. The invention takes advantage of the browsing technology and languages available in order to create a new paradigm of data entry which can be operated efficiently by any user throughout the world for any application for which uses a description. While the invention is well-suited to the Internet context, those skilled in the art will appreciate its many applications in off-line systems, as well, such as inventory and Point of Sale ("POS") systems. Moreover, though the invention is well-suited and described in terms of references to "goods" for sake of clarity, those skilled in the art will appreciate its application extends equally to services and other described items in a similar manner.

The invention comprises a dictionary knowledge base which provides lists used to describe goods, services or other items. Embodiments of the invention may also include corresponding databases for guidelines, definitions and user help. The invention further comprises facilities whereby the user may enter a description or may review a first listing from the dictionary database and select the appropriate first element. The invention attempts to determine whether a definitive first element match is suggested from any description input. In evaluating such a match, the system may consider a number of factors, including the lists in the dictionary database, the other elements of user input or the environment of the system. The invention may also try to narrow the selection, if appropriate, so that the user chooses from a smaller set of possibilities in the event of an ambiguity.

Regardless of the method of data entry, the input is normalized to a first element in the dictionary database. Depending upon the user input and the first element selected, certain second list elements may be available to the user for selection, as suggested by the links within the dictionary database. Selection will take place via a list review and selection or directly via parsing from the original description input and automatically selecting. Similarly, depending upon the first element and the second element selected, a set of third list elements may also be made available to the user (or may be selected automatically by the system), to which the user may assign values (or have values assigned automatically) to describe the goods, services or items. Each third element has a value associated therewith and may have a label.

Throughout the process, the system may display additional context-sensitive information as to each first element/second element/set of third elements and values selection combination to assist the user with the process. Once this group of elements has been composed to describe the good, service or other item, that final unified specification may be passed or output to a database, search engine or other computer program.

The invention may also comprise links or references to other categorization systems within its database. In such a way, the invention may also generate not only the unified description, but also the categories into which that specification should be placed in various other existing database systems.

The foregoing outlines broadly the features and technical advantages of the present invention in order that the detailed description of the invention that follows may be better understood. Additional features, advantages and a preferred embodiment of the invention will be described hereinafter which form the subject of the claims of the invention.

BRIEF DESCRIPTION OF THE DRAWINGS

For a more complete understanding of the present invention, and the advantages thereof, reference is now made to the following descriptions, taken in conjunction with the accompanying drawings, in which.

DETAILED DESCRIPTION

Figure 1:
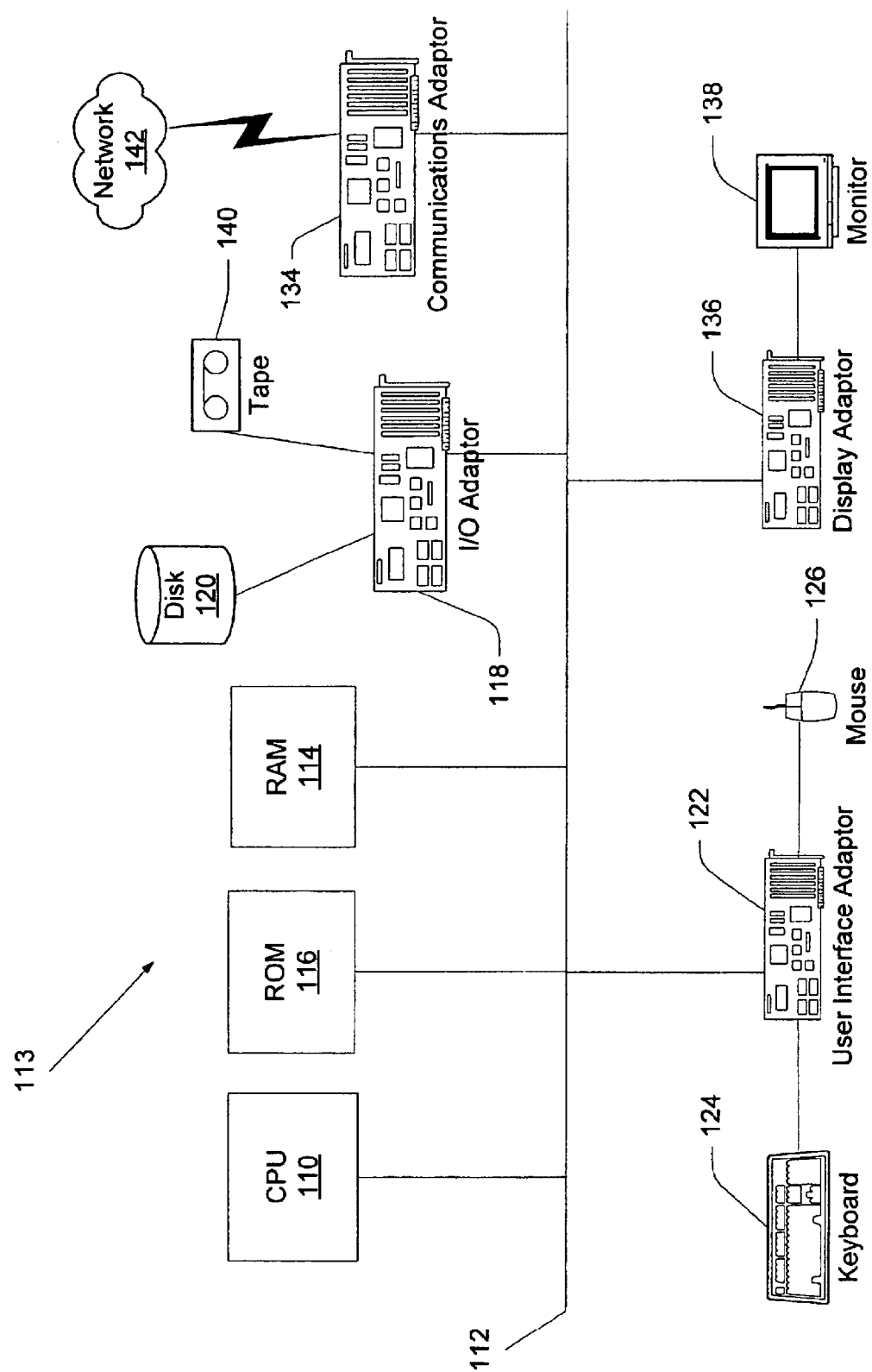
FIG. 1 is a system diagram of a data processing system, including hardware and firmware, which may be used to implement the instant invention.

In the following description, numerous specific details are set forth such as computer applications, programming languages, user interface systems, database structures and implementations, operating systems, network systems, communications systems, protocols, input output ("I/O") systems, etc., to provide a thorough understanding of the invention to the reader. However, it will be obvious to those skilled in the art that the present invention may be practiced without such specific details and, in fact, that those embodiments described herein may be modified in many details, all falling within the teaching of this disclosure. In other instances, well-known applications, network systems, communications systems, data formats, protocols, and computer equipment have been shown in block diagram form in order to not obscure the present invention in unnecessary detail. For the most part, details concerning timing considerations, specific applications used, specific languages used, specific network or communication systems used, specific data formats used, and the like have been omitted inasmuch as these details are not necessary to obtain a complete understanding of the present invention. Moreover, these details are well within the skills of persons of ordinary skill in the art.

It should be understood that, in the context of this disclosure, a "server" or a "server machine" is a reference to a data processing system which runs a server program, which provides services to other data processing systems, such as access to databases, etc. In fact, the data processing system that acts as a server may also run other programs, including programs that interact with and use the services offered by the server program within a network system. Likewise, a "client" is a data processing system which runs a client program and may run other programs, including a server program. Accordingly, it is possible, although those skilled in the art will appreciate that it may not be practical in many instances, for a single data processing system to act as the server and the client simultaneously.

Those skilled in the art will also appreciate that, throughout this specification, the terms "data processing system", "machine" and "computer" are used interchangeably, each having the meaning of a data processing system in the broadest sense and description.

The term "database" used within the specification is intended to encompass any collection of data within a data processing system. Accordingly, it is observed that a "database" may be data that is used by a spreadsheet program, a word processing program, an accounting program, as well as a database program. Moreover, the term "database" does not imply a particular format to the data stored, but is intended to encompass all types and forms of data formatting within data processing systems. Those skilled in the art will also appreciate that the concepts taught in this specification and covered within the scope of the claims that follow are universal and will readily apply to database formats and systems developed in the future. It will further be appreciated that the database referenced may not only be a free-standing database, but a database which is a part of another application. Accordingly, many of the popular applications in the art which make use of databases (such as point of sale systems, auction systems, sales systems, classified advertising systems, rental systems and the like) may be utilized in conjunction with the instant invention.

The term "noun" is used also in a broad sense as the subject of a sentence. It will be appreciated that many different forms of words (gerunds, prepositional phrases, etc.) can act as nouns within the English language and other languages, including computer or symbolic languages. Nouns may include all types of items, including physical, metaphysical, tangible, intangible, etc., without restriction. Each of these different words or group of word forms are intended to be encompassed in the word "noun" as it is used in this application, without regard to particular language or the specific construction or classification within any particular linguistic system. It will also be appreciated that the described system and method is in terms of "nouns" for the example of a goods description system and method. For corresponding example of a services-based system and method, the references to "nouns" would be changed to "verbs" and likewise include verbs, verb phrases, etc. Similarly, "nouns" could be other items which are neither nouns nor verbs, providing that the items are anything that is to be described.

The terms "adjective" and "attribute" are used in the broad sense of those words. While the term "adjective" is used to describe the word or phrase which modifies the noun in the context of this application, it will be readily apparent to those skilled in the literary arts that such adjectives may have other functions in language, such as adverbs and the like, and that all such words are intended to be encompassed in the term "adjective". Likewise, an "attribute" could be any number of adjectives or adverbs which modify or further describe a noun. An attribute generally comprises a value and may comprise a label which describes the value. For example, "Size 13" may be an attribute, in which "13" is the value and "Size" is the label. It will be appreciated that in some circumstances, it will be unnecessary to use the label in the attribute (e.g. "red" may not require "color red").

Both "attribute" and "adjective" may have one or more equivalents in different linguistic systems, all of which are intended to be encompassed by the respective words as used in this application. It will be appreciated that as to a services-based system and method, the corresponding words would be "adverb" and "attribute", each of which are defined with corresponding breadth.

The term "word" is used in its traditional broad sense to indicate a unit of symbolic representation within a language. However, it will be appreciated that, in the context of this disclosure, the term "word" is intended to encompass numbers, symbols, word phrases and sentences, as applicable. Accordingly, though this disclosure may discuss the selection of a "word", it is to be understood that the selection could equally be the selection of a number, symbol, word phrase, a phrase or a sentence, all falling within the scope of the disclosure and invention.

A representative hardware environment for practicing the instant invention and its components is depicted with reference to FIG. 1, which illustrates a hardware configuration of a data processing system 113 in accordance with the subject invention. The data processing system 113 includes a central processing unit ("CPU") 110, such as a conventional microprocessor, and a number of other units interconnected via a system bus 112. The CPU 110 may include other circuitry not shown herein, which will include circuitry found within a microprocessor, e.g. execution unit, bus interface unit, Arithmetic Logic unit ("ALU"), etc. The CPU 110 may also reside on a single Integrated Circuit ("IC") chip.

The data processing system 113 includes a Random Access Memory ("RAM") 114 and a Read Only Memory ("ROM") 116. Also included are an I/O adapter 118 for connecting peripheral devices such as disk units 120 and tape drives 140 to the bus 112, a user interface adapter 122 for connecting a keyboard 124, a mouse 126 and/or other user interface devices, such as a touch screen device (not shown) to the bus 112. Further included may be a communication adapter 134 for connecting the data processing system 113 to a data processing network 142. For user interface purposes, the data processing system 113 may include a display adapter 136 for connecting the bus 112 to a display device 138.

Those skilled in the art will appreciate that the representative hardware environment depicted in FIG. 1 may be suitable not only to execute the description system, but also the server and client implementations of the invention. Also, the data processing system 113 may also serve to execute network functions, such as routing and communication serving, which may be necessary for the proper and efficient operation of underlying network environments.

Figure 2:
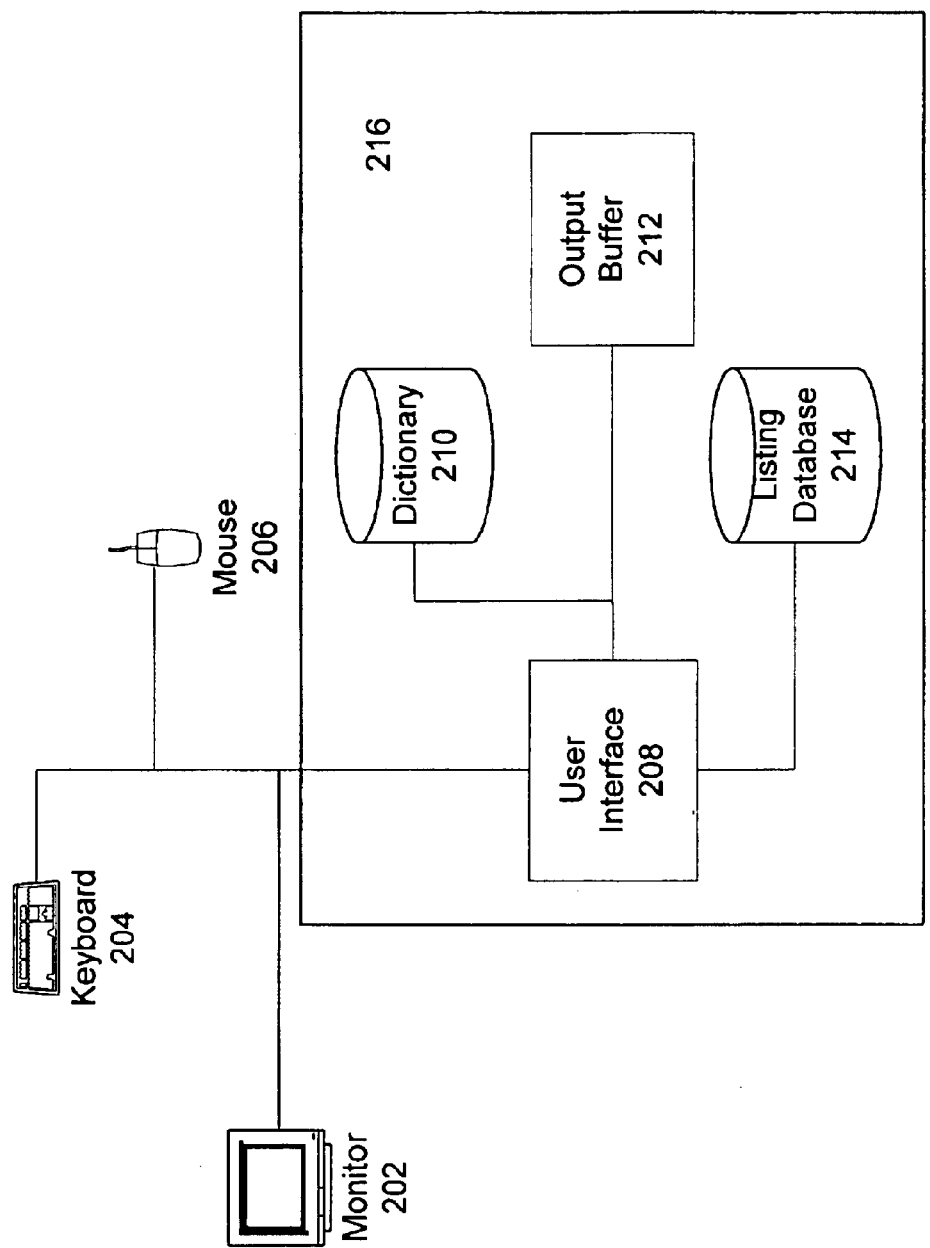
FIG. 2 is a block diagram depicting the interface of the system and method of the instant invention with a database-using program within a data processing system.

A description of the overall system is provided with reference to FIG. 2. Depicted is a data processing system 216 having a monitor 202, a keyboard 204, and, optionally, a mouse 206. While the monitor 202, the keyboard 204, and the mouse 206 are shown for demonstrative purposes, those skilled in the art will appreciate that any number of I/O devices, including voice-recognition systems Wireless ApplicationProtocol ("WAP") systems, light emitting diode ("LED") display systems, liquid crystal display ("LCD") systems, and voice output systems, may be used in a data processing system in order to provide physical connection and interface to the user.

The data processing system 216 features a user interface 208. The user interface 208 is in data communication with the monitor 202, the keyboard 204, and the mouse 206. The user interface 208 provides a user-friendly means for the users to communicate with the system of the present invention. In one implementation of the present invention, the user interface 208 features a graphical user interface ("GUI") and a menu-based interface system.

The information displayed through the user interface 208 is determined by reference to a dictionary database 210. Though the dictionary database 210 is depicted as residing on a hard storage medium, those skilled in the art will readily appreciate that the dictionary database 210 could be stored in any one of numerous formats well known in the art, including RAM disk, on networked shared storage, floppy disk, tape drive, etc.

The dictionary database 210 comprises one or more tables or lists. The lists may store nouns, adjectives and attributes (both labels and the corresponding possible values or ranges of values). In an alternative embodiment, the lists may store verbs, adverbs and attributes. It will be appreciated that, although this specification uses the example of the description system, and accordingly refers to the first list, the second list and the third list as containing elements called nouns, adjectives and attributes, respectively, the example is presented as such for the sake of clarity. The first list, second list and third list could contain verbs, adverbs and attributes or similar lists, all falling within the bounds of the instant invention.

In the example of the goods system, the nouns are ideally mutually-exclusive in nature, so that a good is ultimately described by one, unified noun in the database. Accordingly, the mutual-exclusivity is achieved by a database which may include synonyms and/or related words but which ultimately suggests one and only one noun for the item described. Those skilled in the art will appreciate that, though a totally mutually-exclusive database is ideal, there may be instances where a database is not completely mutually-exclusive, either by error or deficiency. Therefore, it will be appreciated that the instant invention may function with a non-mutually-exclusive database in certain instances.

The noun list may have associated with it additional entries or lists which provide information as to synonyms and related words corresponding to the noun elements in the noun list. In one embodiment, each noun element may have associated directly with it (e.g. within a field of the data element) zero or more synonyms. In another embodiment, the noun list may be composed of nouns and synonyms, each element having links to denote corresponding words. In yet another embodiment, several lists may be used, one having just nouns and one or more others having synonyms. It will be appreciated by those skilled in the art that each noun may have associated with it zero or more synonyms. Likewise, it is possible for each synonym to have associated with it one or more nouns. Synonyms may be divided by characteristic or otherwise organized to facilitate processing.

It will likewise be appreciated that the adjective list and the attribute list may likewise contain additional elements or lists which are merely synonyms for the adjectives and attributes, respectively. It should also be appreciated that additional information may be stored with each of the elements of a list, including not only display/output preferences, but also substantive instruction flags to indicate various suggestions implied by a synonymous element in one list as pertains to selection of elements of another list. For example, "loafer" may be listed as a synonym of "shoe" in the noun list. However, the "loafer" entry may contain additional information flags to suggest that the appropriate adjective associated with the "shoe" selection should be the "slip-on" selection.

The fields for the data in the dictionary database 210 are linked so that nouns are associated with both the adjectives and attributes that are applicable to the noun. Likewise, noun-adjective pairs may be associated with attributes. It should also be noted that each attribute will have associated with it the label by which it is known; it may also have associated with it the various values and/or value ranges which are valid for that attribute. Also contained in or linked to the dictionary database 210 may be definitions, descriptions and other help data that can be displayed through the user interface 208 on to a monitor 202 or other display device to provide the user assistance in assembling a specification.

In one embodiment of the instant invention, the dictionary database 210 may contain references to other category systems, either by direct data or by link, which are associated with the nouns, adjectives and/or attribute values. Those skilled in the art will appreciate that the composition of the dictionary database 210 may be quite complex, so that certain categories are associated only with certain noun, adjective and attribute value combinations. Conversely, the association to other categories may be quite loose and quickly programmed.

The other category systems referenced may be mutually exclusive or non-mutually exclusive systems. Generally, but not necessarily, the other category systems will comprise a set of existing category systems to which the instant invention will be adapted, such as the category systems employed by Internet auction sites, goods or services directories and the like.

The user wanting to describe a good may activate the user interface 208 in order to access the dictionary database 210 to provide a noun. User activation of the user interface 208 may be accomplished in many different ways, depending upon the user interface 208 involved. If the user interface 208 provides facilities for character entry, the user may type in words or phrases which the user associates with the goods. In such a case, the user interface 208 parses the entry to locate the noun, adjective and attributes provided, if any. Alternatively, the user interface 208 may permit the user to select from a list of goods using directional indicators or a pointing device, such as a mouse 206. In such an alternative, the list of goods provided to the user is taken directly from the dictionary database 210. In still other user interfaces 208, voice recognition input systems may permit a user to activate the system by pronunciation of words associated with the good.

In the event that the user interface 208 permits the user to activate the system by typing or speaking words or phrases, the user interface 208 may access the dictionary database 210, along with any associated dictionary or thesaurus files or databases, in order to locate the one or more nouns which the system recognizes based upon the parsed input. In an alternative embodiment, the user interface 208 may permit the user to enter or dump an entry or entries from a data store (not shown) directly into the system. In such a case, the data received is treated as user input would be when typed from a keyboard or other textual input.

In the event that some textual input form is received from the user input, in some cases, a single noun will be derived from the dictionary database 210 based upon the parsed input. The single noun may be located either directly or via a synonymous entry. In such a case, the single dictionary database noun is placed into the output stream or buffer and no additional user information or input is required.

The system will attempt to narrow any ambiguities based upon any number of factors, depending upon the implementation of the system. In one embodiment, the system determines noun selection only based upon the noun entry. In an alternate embodiment, the system will determine the noun selection based upon the noun entry and potential other matches as to adjective and attribute that might be made if a particular noun is selected. For example, if "1977 yellow blazer" is entered, the synonym "blazer" may point to either "SUV" (a common abbreviation for "Sport Utility Vehicle") or "jacket". Using the other user-entered and parsed words, however, the system will determine that, although "yellow" could apply to either a "SUV" or a "jacket", "1977" would likely only apply to a truck. Accordingly, "SUV" would be selected as the noun.

Some embodiments of the system may use environmental factors to influence noun selection, as well. Those factors may include such things as from where the system is accessed, the identity or characteristics of the individual activating the system or the identity or characteristics of the destination of any output stream from the invention. Accordingly, in the "blazer" example, if the output stream was destined for an automobile advertisement listing, the system may determine that "blazer" should indicate a selection of "truck".

In the event that more than one dictionary database noun is synonymous with the noun input by the user and the ambiguity cannot be resolved, or in the event that only a pointing input device, such as the mouse 206, is available to the user for input purposes, a list of all possible nouns may be displayed to the user on the monitor 202 for the appropriate selection. If the input device permits, the listing may be narrowed based upon any input provided. The user interface 208 may provide definitions or help to the user, based upon the information contained within the dictionary database 210, in a context- or environment-sensitive manner. The user may select a noun from the provided listing using the keyboard 204 or the mouse 206 as provided by the user interface 208. Once selected, the noun is placed into the output stream buffer. In an alternative embodiment, the originally-input noun may also be placed in the output stream buffer or may be placed in the output stream buffer alone.

If a parsed adjective exists from the input data, the user interface 208 determines whether that adjective is or suggests with certainty a valid adjective within the dictionary database 210 for the noun that was selected. It should be appreciated that this matching process as to the adjective will be performed in a manner similar to that described for the noun matching routine, including the evaluation of synonyms and related words. If a match is determinatively selected, that adjective is output directly to the output stream or buffer. If there is ambiguity, the user interface 208 may narrow the listing of adjectives from the dictionary database 210 accordingly and display options to the user on the monitor 202 for selection. In such an instance, definitions and/or help information on the possible options is provided to the user through the monitor 202 based upon the information in the dictionary database 210.

If no adjective exists from the input data (either because none was input or because the user interface 208 only supports a mouse 206 or other pointing device), the user interface 208 follows the links in the dictionary database 210 to display to the user on the monitor all 202 the adjectives associated with the selected noun, if any. Any available associated definitions and/or help information from the dictionary database 210 may also be displayed through the user interface 208 on the monitor 202 for the user's assistance in selecting an adjective.

Similar to the procedure followed with respect to the noun, the user may select an adjective using the keyboard 204 or the mouse 206. The information is likewise entered into the user interface 208, causing the system to output to the output stream or buffer the selected adjective.

Subsequently, the user interface 208, based upon the noun and adjective selected and the parsed input (if any), references the dictionary database 210 for attributes, including attribute labels and/or available attribute values, applicable to the noun/adjective combination. A matching routine is again performed in order to determine if there are one or more attributes definitively suggested by the user input, taking into account synonyms and the like. Again, if no definitive attributes are detected from any data input, the set of possible attribute labels, along with any associated help or definitional information is conveyed to the user interface 208 for display on the monitor 202.

As each attribute label is selected using the user interface 208, the user may also, depending upon the attribute, be prompted for additional keyboard-204 or mouse-206 based input for an attribute value. For example, if the attribute is "size", the user may be prompted for input, if appropriate. In some cases, a range of values may be appropriate (e.g. "size 34–35"). Each attribute is also output to the output stream or buffer. The format in which the attribute is output may vary from attribute to attribute, depending upon the information stored within the dictionary database 210. Accordingly, some attributes may display the attribute value only; other attributes may display the value and the label; other attributes may display the label and the value.

More than one attribute may be selected and values entered for each noun/adjective combination. Accordingly, the foregoing selection process may be repeated as often as required, so long as an attribute information in the output stream or buffer is not duplicated or directly contradicted (e.g. when the noun/adjective is "shoe, dress", one may not select size 13 and size 10).

Once the user and the system have selected the noun/adjective/attributes combination, the user interface 208 composes a listing string 212 from the accumulated output stream buffer. It should be noted that the listing string 212 may be composed from the accumulated output stream buffer in any order, so that the attributes are listed first, then the adjective, then the noun or any permutation thereof. In addition, portions of the label may be displayed before and after the value. Indeed, the order in which the elements are to be put into the listing string 212 may vary from element to element and may, accordingly, be specified within the dictionary database 210. Moreover, portions or the entirety of the elements may be placed within other elements (e.g. the noun placed within the adjective, etc.). As depicted, the listing string 212 may be composed with linking reference to the dictionary database 210. In an alternative embodiment, the listing string 212 may be generated to exist in written text, speech synthesized or other format and may exist independently of the dictionary database 210. Additionally, the listing string 212 may include the original user input (in part or in whole) to supplement or replace any element determined by the system. Moreover, the listing string 212 may include other information, such as synonyms for words, etc., as suggested by the dictionary database 210.

Once the listing string 212 is composed, the string may be written to a listing database 214. Those skilled in the art will appreciate that, though the listing database 214 is depicted as a hard data storage system, the listing string 212 could be written to any type of data storage medium either as an item to be included in the data storage medium or as an inquiry as to data existing on the storage medium. In addition, in an alternative embodiment, the listing string 212 may be passed directly to a database system, either as an entry or as a search query, which acts as the listing database 214. In this way, the instant system may be used in conjunction with or may comprise any of the many applications that make use of database technology, such as on-line and off-line sales facilitation or listing systems, search engines, inventory control systems, customer assistance softwares, translation services, web page authoring systems and the like.

For further clarity, and by way of example, the usage of the system depicted in FIG. 2 is further described with reference to the example of describing a size 42-regular trench coat. First, the user activates the system and may request a list of all available nouns. The user is prompted to select from one of a number of possible nouns. Since activation requested all available nouns, the list of nouns may include coat, boat, train, plane, automobile, etc. The user selects coat. Associated with coat in the dictionary database 210 are various adjectives: trench, plastic, sport, etc. User selects "trench". Associated in the dictionary database 210 with trench and coat are various attributes, such as size, color, etc. When the user selects "Size", he or she is prompted to input (via menu or direct text input) the value corresponding to "Size" and does so: "42R". Accordingly, a listing string 212 is composed: "trench coat, 42R." Such listing string 212 may then be added to the listing database 214. In this manner, uniformity in specification of the coat has been obtained in a user-friendly manner.

In the identical example, if activation indicated "rain slicker" as directly-typed user input, the system parses the input into the noun "slicker" and the adjective "rain". The system searches the dictionary database 210 and may determine that "slicker" is listed as synonym and has only one noun associated with it in the dictionary database 210: "coat". Accordingly, "coat" is put into the output buffer. The system then searches for the adjectives associated with "coat" and determines that "rain" is not one of them. The system uses all other information available to it (environment, etc.), but is unable to resolve the ambiguity as to the meaning of "rain". The system accordingly provides the user the various adjectives available for "coat" for appropriate selection. The user selects "plastic", which is placed into the output buffer. The system composes the unified listing string of "coat, plastic".

Figure 3:
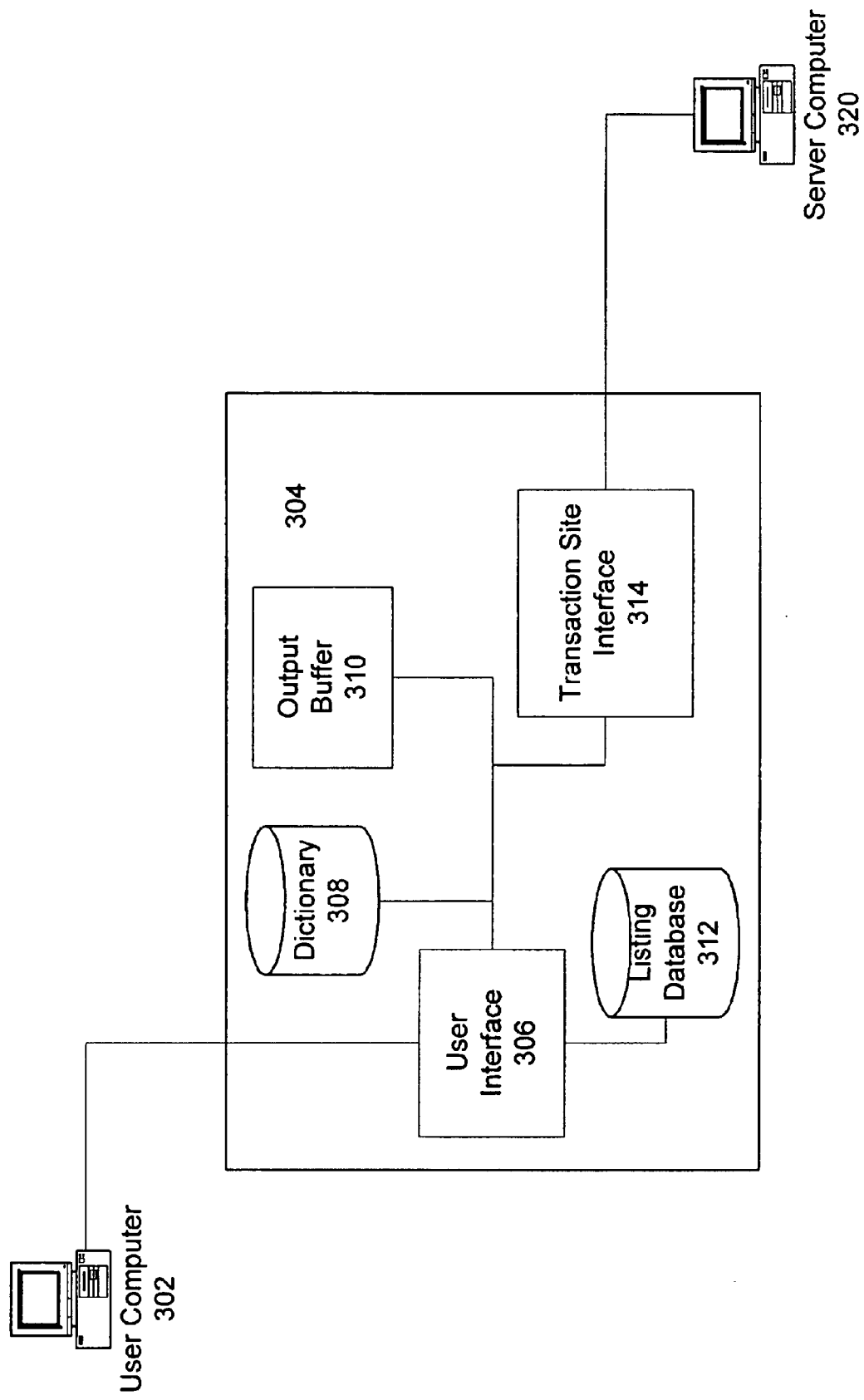
FIG. 3 is a block diagram depicting an embodiment of the operation of the instant invention in the context of a wide-area network, such as the Internet.

Use of the instant invention in an on-line context, for example over the Internet, is described with reference to FIG. 3. FIG. 3 depicts a user computer 302. The user computer 302 may be executing any one of a number of Internet browser softwares to provide users access to the other computers on the World Wide Web. Alternatively, the user computer 302 may execute custom or other applications to permit direct interface over the Internet via TCP/IP transmission. In other embodiments, the user computer 302 may connect to other computers via local area network ("LAN") or other network connection.

Also depicted is a description system 304 comprising a user interface 306, a description dictionary 308, storage for a listing string 310 for storage in the listing database 312. The description system 304 is connected to the user computer 302 by any one of several means well appreciated within the art, including wired (dial-up line, leased line, etc.) or wireless (Ricochet™, IEEE 802.11, etc.) connection. Additionally, the description system 304 comprising a transaction interface 314 for a connection to a server computer 312. The transaction site interface 314 provides the listing string 310 which is generated by the system 304 to the server computer 320 for listing within a database, such as an auction, consumer goods sales or web site construction database.

Though the description system 304 is depicted as a pass-through type system separate from the user computer 302 and the server computer 320, those skilled in the art will appreciate that the description system 304 may be incorporated into either the user computer 302 or the server computer 320, maintaining the same functionalities and still falling within the scope of the instant invention. Similarly, portions of the description system 304 may be incorporated into both the user computer 302 and the server computer

320, so that the same functionalities are maintained. In such alternative embodiments, the listing database 312 may be omitted from the description system 304, so that the listing string 310 is transferred directly to the transaction site interface 314 for transmission to the server computer 320 or for inclusion in a database or query on the server computer 320. However, in such an embodiment, the user computer 302 must contact the server computer 320 to obtain verification and confirmation of any listing or query placed on the server computer 320.

The method of the instant invention is described with reference to FIGS. 4, 5 and 6, beginning with FIG. 4. The method begins 402 with the precondition of a dictionary database having lists of nouns, adjectives and attributes (including labels and values) interlinked. In an alternative embodiment, several databases may be used to store noun, adjective and attribute data, functioning in concert as the dictionary database. As previously noted, the lists described with reference to the goods descriptors of noun, adjective and attributes are provided merely for example. The dictionary database may have lists corresponding to verbs, adverbs and attributes or other lists, as appropriate to the other items to be described by the system.

The system prompts the user for input 403. The input may be either direct input (e.g. entry of a description by the user) or input indicating a request for a listing of nouns. The system reads a list of nouns from the database 404, placing the listing into temporary memory buffer for easy reference. Those skilled in the art will appreciate, however, that the database could be read directly as required by the remainder of the method, resulting in an equivalent effect which falls within the bounds of the invention as described herein. Other reading methodologies may also be employed, all falling within the bounds of the invention.

The system next attempts to match 405 the input to the noun list read from the database. If direct input was received, the system parses the noun from the input and compares the database nouns with the noun entered in an attempt to form a direct match. Direct matches may be formed either by the user having input the exact noun as found within the database or by the user having input a noun which suggests one and only one entry within the database. Such a suggestion may be accomplished by the input providing a synonym which is associated with only one noun in the noun list. Such a suggestion may also be accomplished if more than one noun is associated with a matched synonym, providing that the system is able to use the other input, the environment, or the other factors to determine that only one noun from the noun list qualifies for match. If a direct match is located 405, the product of the direct match is placed into the output buffer 415.

If no direct match is located 405 (including in the event that no direct input is received and only a request for a listing is made), the list of nouns from the database is displayed 406 on the user machine. It will be appreciated that the display 406 of the noun list will be narrowed if possible. By way of example, accordingly, if no direct match is located 405 for reason of the system being unable to definitively select between just two noun entries, only those two noun entries will be displayed 406. On the other hand, should the input from the user comprise a request for a complete listing, the entire listing will be displayed 406. During the display 406, the user is prompted for an action for the system to perform.

The system evaluates 408 the user reaction to the prompt and branches execution accordingly. It will be appreciated by those skilled in the art that, although a number of options are described in the following disclosure, certain embodiments may omit one or more of these choices, all falling within the bounds of the disclosed invention. It will also be appreciated that these options are limited by context, and that some options may not be appropriate to all contexts. In these cases, such options are intended to be omitted. For example, in a system in which freeform entry was to be restricted, an option to enter freeform text would not be appropriate.

The user may opt to re-enter direct input 403, in which case execution loops back to the user input step 403. Execution proceeds normally, as previously described.

Should an incomplete listing of nouns be displayed 406, the user may opt to display a more complete list 406, including the entire list. In this way, the user may elect additional elements without re-attempting manual text entry.

If help is requested 408, it is provided to the user 409. Once the user is finished accessing help 409, execution continues with the re-display of the noun list 406. In an alternative embodiment, a certain degree of assistance may be provided to the user by default, with additional information available upon request. In yet another embodiment, all help information may be displayed directly without user request. Some instances of the invention may permit a user to select a default of these three embodiments.

The user may be given the option to request a free form entry 408. Upon selecting such an option, the user will is permitted to enter 412 a freeform description without the assistance of the other processes of the instant invention. In such a case, execution proceeds, as depicted on FIG. 6, by the publication of the freeform description to the output database 634. It will be appreciated, however, that by bypassing the unification features of the instant system, many of the advantages offered may be forfeited.

Again with reference to FIG. 4, the user ultimately selects a noun 408 in order to continue execution of the system. In such a case, upon selection the system places the noun into the output buffer 415. The system may also place any display information (format, placement, etc.) specified by the dictionary database into the output buffer. If specified by the dictionary database, such display information may include any text originally entered by the user.

The operation of the system is continued to be described with reference to FIG. 5. Next, the system reads 502 a list of adjectives from the database into a temporary buffer. As with the noun listing, those skilled in the art will appreciate that at temporary buffer need not be used, but that equivalent access measures may be undertaken, all falling within the scope of the instant invention. Unlike the reading of the noun listing, however, the entire database of adjectives is not read. Rather, only the adjectives which are associated with the noun previously selected are read. Accordingly, the database is effectively filtered for only those adjectives which apply to the selected noun.

The system parses the adjective from any direct entry made by the user and attempts to definitively match 504 any input adjective to the adjective list from the database, much as the noun input was matched determinatively with the noun list. Synonyms stored within or linked to the adjective list may be used to facilitate proper matching. Accordingly, the system may use external factors, the other text input and any other information available to the system to determine a definitive match. If successful, the product of the match is placed in the output buffer 516. If unsuccessful (either for reason of there being more than one possibility or because no adjective was entered by the user), the list of possible adjectives is displayed 506 (as narrowly as possible) on the display device with the appropriate prompts.

Again the system awaits a user reaction to the displayed list, evaluating 508 the reaction when received. The user may enjoy several options, as appropriate. If the user selects 508 to try again, execution of the method loops back to accept user input 403 as shown on FIG. 4.

Again with reference to FIG. 5, the user may request that a listing of all of the available adjectives be displayed. In such a case 508, the method displays 506 the complete listing and again awaits user reaction.

As with the noun selection, the user may request help. When such a request is received 508, the appropriate help is displayed 509 based upon context and the user default parameters as indicated for the help in selection of the noun.

If the method detects 508 that freeform entry is requested, the user is prompted to enter 512 a freeform text. As demonstrated with reference to FIG. 6, the freeform description may then be published directly to the output database 634.

Returning to reference FIG. 5, in order to continue with selection of a unified specification, the user eventually selects 508 an adjective. That selected adjective is then placed into the output buffer 516. It should be noted that "no adjective" may be a selection, in which case appropriate output is added to the output buffer to signify that the described item does not have an adjective.

Figure 6:
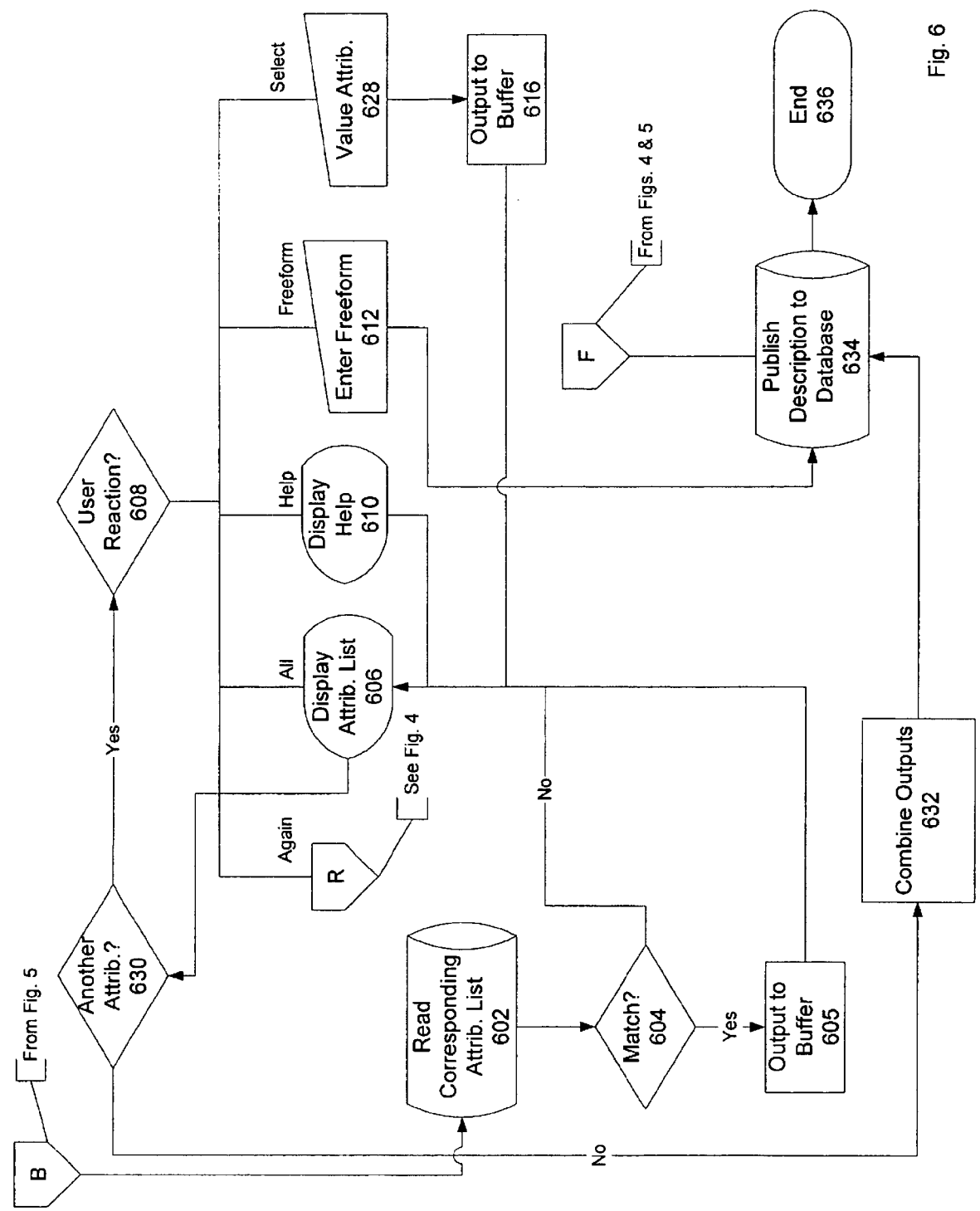
FIG. 6 is part 3 of a flow chart diagram drawn in accordance with ASNI/ISO specification 5807-1985 depicting the operation of the current system and method.

Execution proceeds as described on FIG. 6. The list of attributes corresponding to the selected noun/adjective pair is read from the database 602. It should be noted that this reading is done in the same manner in which the noun and the adjective reading was performed, and that it may be similarly deferred while still falling within the bounds of the instant invention. Likewise, the reading function performs a similar filtering function, reading 602 only the eligible attributes based upon the noun and adjective selected previously during execution. It should be noted that the reading of the attributes reads not only the labels associated with the attributes, but also the range of values (if available) which may be associated with the attribute label. In this manner, data checking can be performed to insure valid values for each attribute are entered into the system.

The system attempts to match 604 any attribute labels and/or values entered directly by the user to the attributes read from the database. If any attribute labels or values match, each of the matched normalized attribute values (and optionally the attribute labels if required by the dictionary database) are placed directly into the output buffer 605 and the system displays 606 the other possible attributes to the user. If not 604, the system displays 606 the attribute list to the user. As with the noun and adjective lists previously displayed, the listing presented 606 to the user may be narrowed if desired and possible based upon the match attempt, but will at most contain only those attributes available based upon the noun/adjective pair selected.

The user is prompted 630 whether an attribute (or additional attribute, if an attribute has already been previously specified) should be specified, as zero or more attributes may be specified for each noun/adjective pair. If the user selects 630 that another attribute should be specified, the user is again prompted 608 for an appropriate action.

Figure 4:
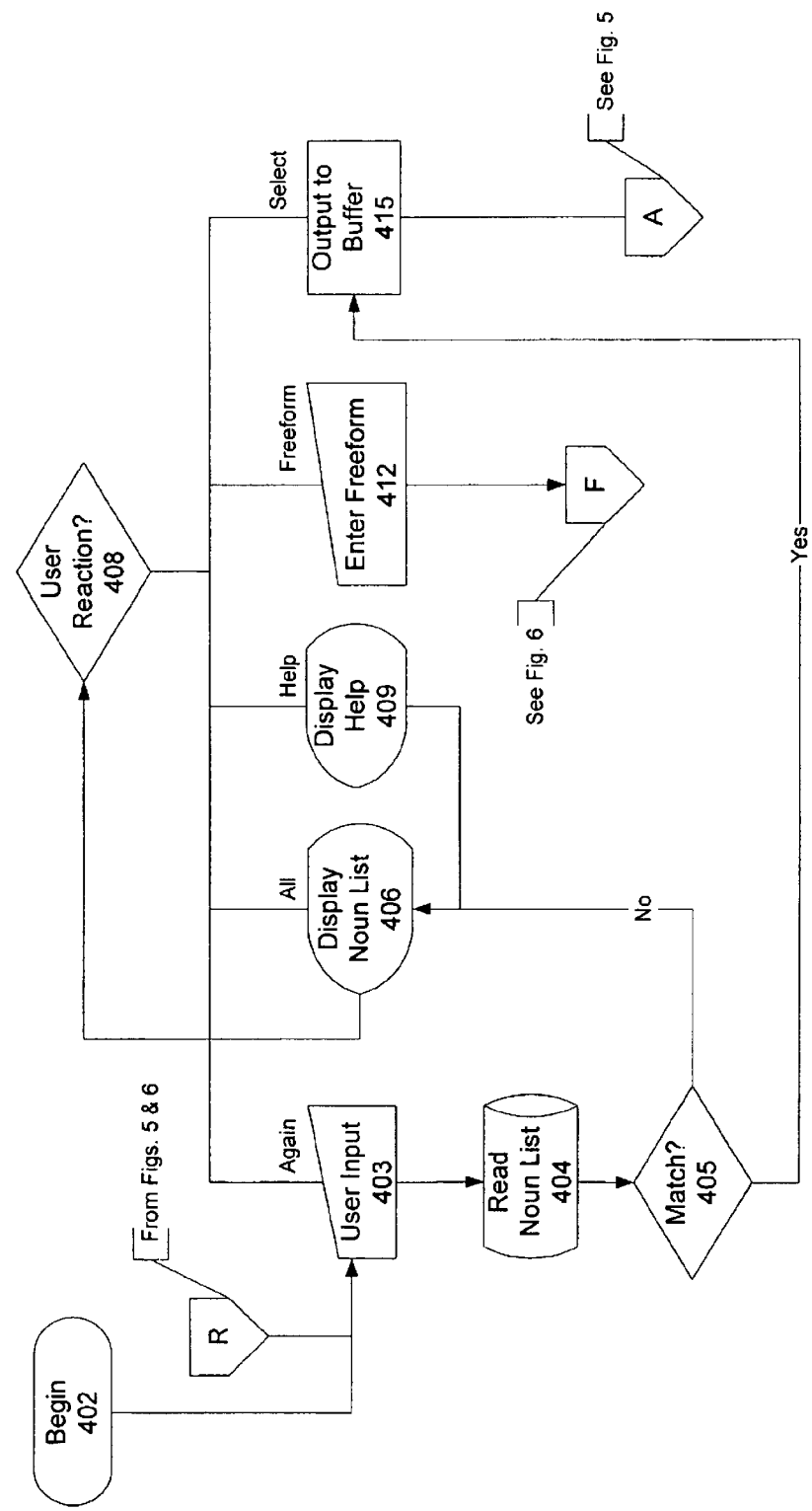
FIG. 4 is part 1 of a flow chart diagram drawn in accordance with ASNI/ISO specification 5807-1985 depicting the operation of the current system and method.
Figure 5:
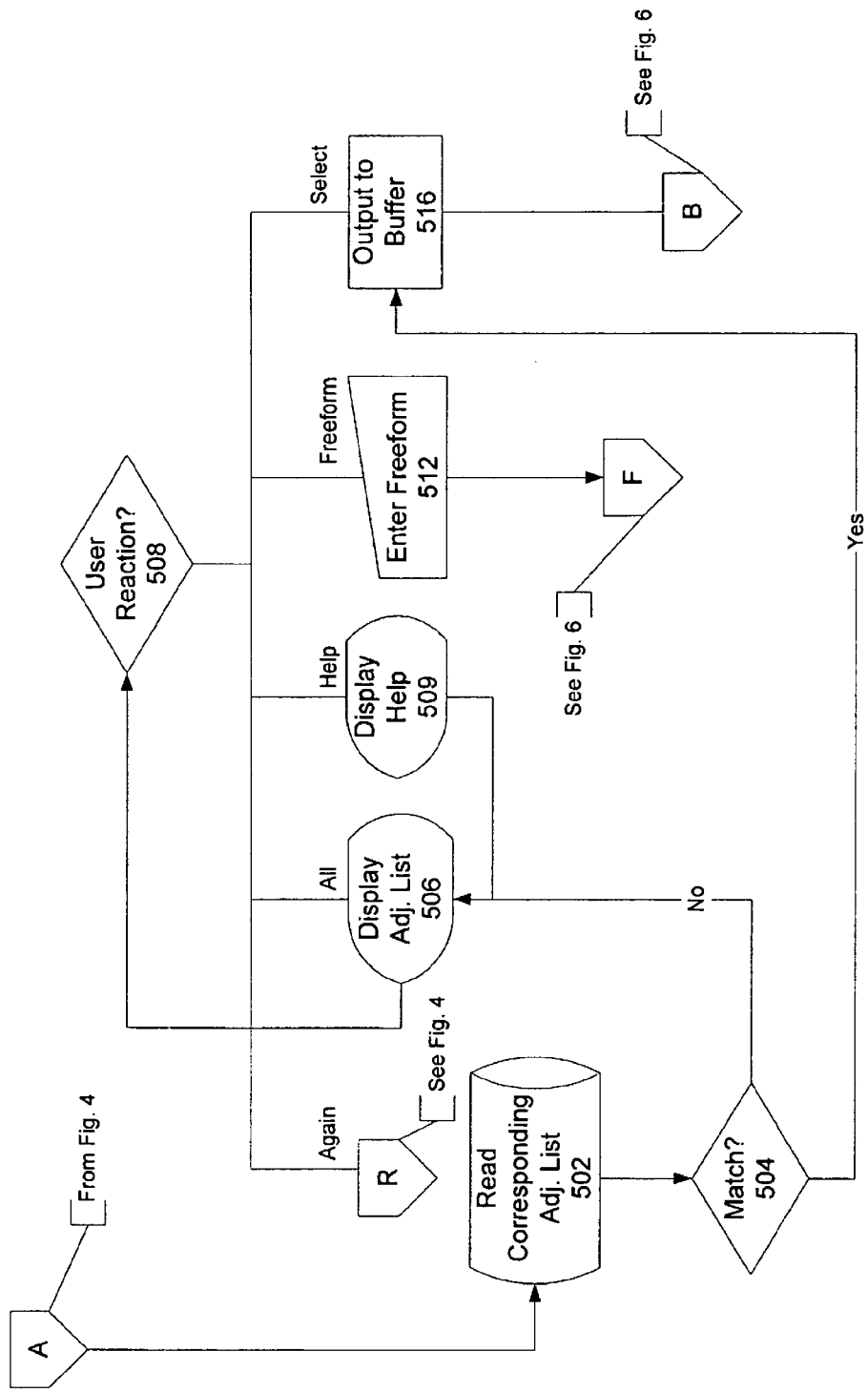
FIG. 5 is part 2 of a flow chart diagram drawn in accordance with ASNI/ISO specification 5807-1985 depicting the operation of the current system and method.

If the user chooses 608 to start over, execution continues with a new user input session 403 as demonstrated on FIG. 4.

If the user chooses 608 to display a complete list of attributes available for the noun/adjective pair selected, the list of attributes is re-displayed 606 and the invention loops so that the user is again prompted 630 as to whether an additional attribute is still needed.

Freeform entry is also offered 608 to the user as a selectable option. Upon such selection 608, the user is prompted to enter a freeform text entry 612, which is then published 634 directly to the output database.

If the user selects 608 an attribute from the listing, the user is then prompted to enter 628 into the system the value associated with the attribute. For example, if the user selects "Size", the value the user enters may be "6" or "6–12" or any other valid size or size range, depending upon the ranges of valid values for the "Size" attribute within the database. The attribute's label and the corresponding value may be added to the output buffer 616. Whether or not the attribute label is output may be dependent upon information stored within the dictionary database and may vary from attribute to attribute.

Several variations on the data entry 628 will readily occur to those skilled in the art. For example, the database may contain a variety of mechanisms to insure valid entry. Uniformity may be insured by transforming any entry to a standard format. It will be noted that in some instances, it may not be desirable to add the label of the attribute to the output buffer 616, instead preferring that the label of the attribute be implied by the format of the data entered by the user 628. For example, it may be unnecessary to have output of "Size 42R" when describing a coat when the mere entry "42R" following a coat suggests, by its format, a size attribute.

Once the user enters or selects the appropriate value for the attribute 628, execution loops to display the remaining attribute list 606. The display 606 again takes into account the fact that the previous attribute has been selected and, if appropriate, removes the previously-selected attribute from the attribute listing. In an alternative embodiment, the display 606 may show the value selected and permit the user to change (not shown) the value, correcting the output buffer.

At such time as the user does not desire to enter or select more attribute values (which may be on the first iteration), the user may so indicate as prompted 630. At that time, the system combines the noun, the adjective, and attribute(s) (values and, optionally, labels) 632 residing in the output buffer and publishes that specification to a database 634. While a buffered system of output and ultimate combination of the elements is described in this disclosure, it will be appreciated that several other comparable data management methods may be used to compose the noun, adjective and attribute(s), including the composition "on the fly" where each element is output as it is selected. However, it will be appreciated that the ability to restart entry through the system is best preserved by withholding final composition of the description until near the end of execution.

System execution ends 636 with the postcondition of a generated specification or a freeform specification placed to the publication database or ultimately output.

Figure 7:
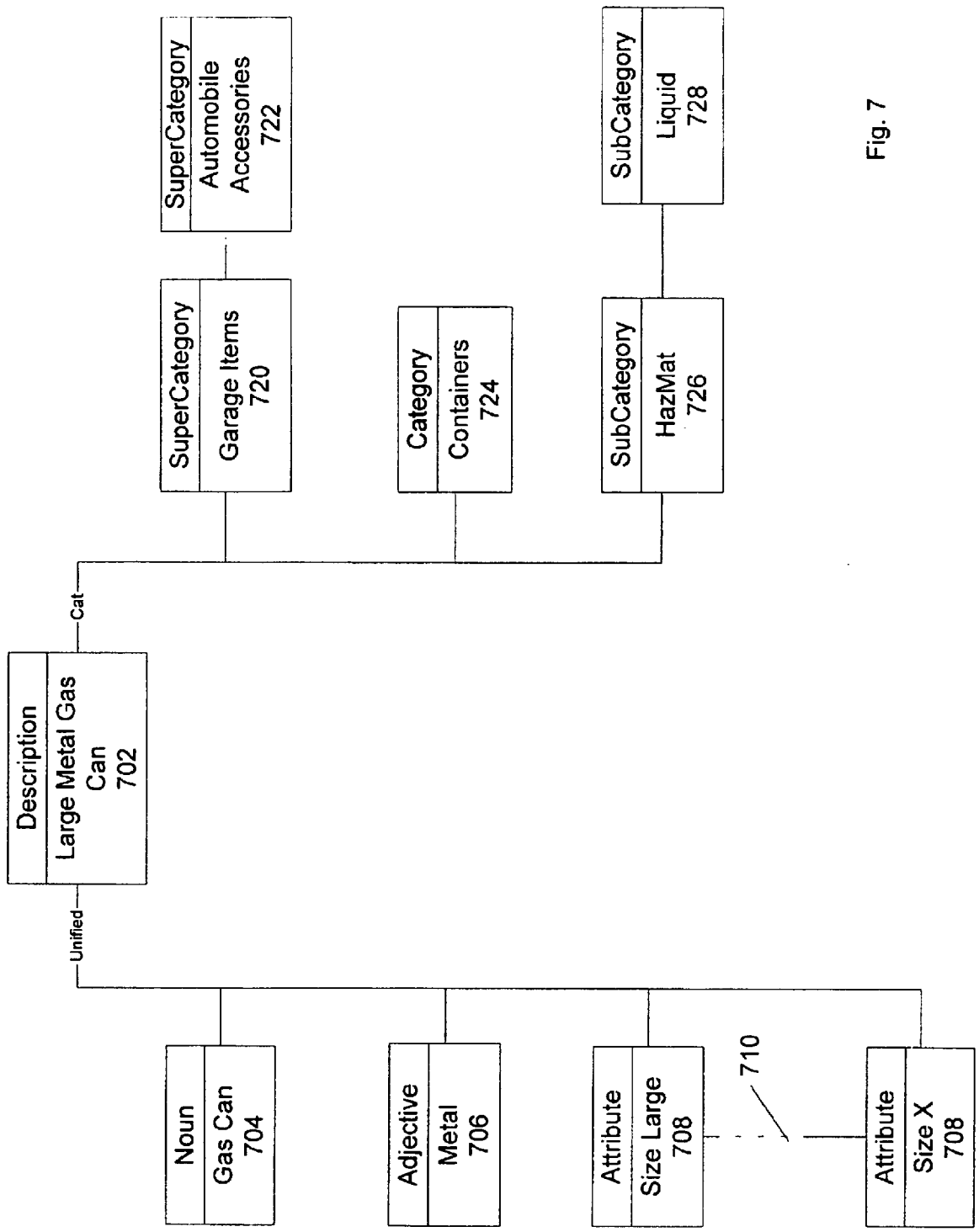
FIG. 7 is a block diagram depicting the operation of the instant invention to generate categories for a description.

The instant invention may be used to also provide categories into which the unified specification should be fit within existing database systems. Example of this functionality is described with reference to FIG. 7. FIG. 7 takes the example of a described large metal gas can 702. Using the method and system described in the foregoing disclosure, the description may be broken into a unified noun 704, adjective 706 and a set of attributes 708, which may include multiple attributes 710.

By placing references within the databases, the instant system may also provide for the automatic categorization of the unified specification (or, by logical extension, the original user-entered description). These categorizations may be provided directly in the database and added to an output stream or buffer in the same manner previously described. The nouns, adjectives, attribute labels and attribute values may suggest any one of a combination of levels of categories which may be compounded based upon combinations of the unified specification elements.

The example displayed in FIG. 7 assumes a categorization system comprising SuperCategories 720, 722, Categories 724, and SubCategories 726, 728, but the reader will appreciate that any number of category divisions may be used.

In the example, the noun "Gas Can" 704 may contain links that such an item will fall within a number of SuperCategories, including "Garage Items" 720 and "Automobile Accessories" 722. That noun may also suggest Categories under a SuperCategory, such as "Containers" 724 and Sub Categories of the Categories, such as "Hazardous Material Storage" 726 and "Liquid" 728. The adjective "Metal" 706 may indicate within the database that the SuperCategory "Automobile Accessories" 722 should be excluded (because, for example, metal containers are generally too heavy to be carried in the automobile). Accordingly, the selection of the adjective affects the SuperCategories and the corresponding Categories and SubCategories.

However, it may be that some of the nouns, adjectives or attributes (either labels or values) have no effect on the categorization at all. For example, the addition of the "Large" size attribute may not add or delete categories from the categorization scheme.

Accordingly, the instant invention may be easily adapted to any categorization scheme by the rules of that scheme being programmed into the databases described. By generating dynamic classifications in this manner in parallel with the normalized description, the system may be easily adapted to be comparable with any existing description/categorization system. It will further be appreciated that more than one categorization scheme may be implemented in parallel with the normalization process, so that one iteration of the descriptive process described generates not only the normalized description, but the proper categorizations under several different systems (e.g. various different auction Internet site categorizations and inventory systems).

Figure 8:
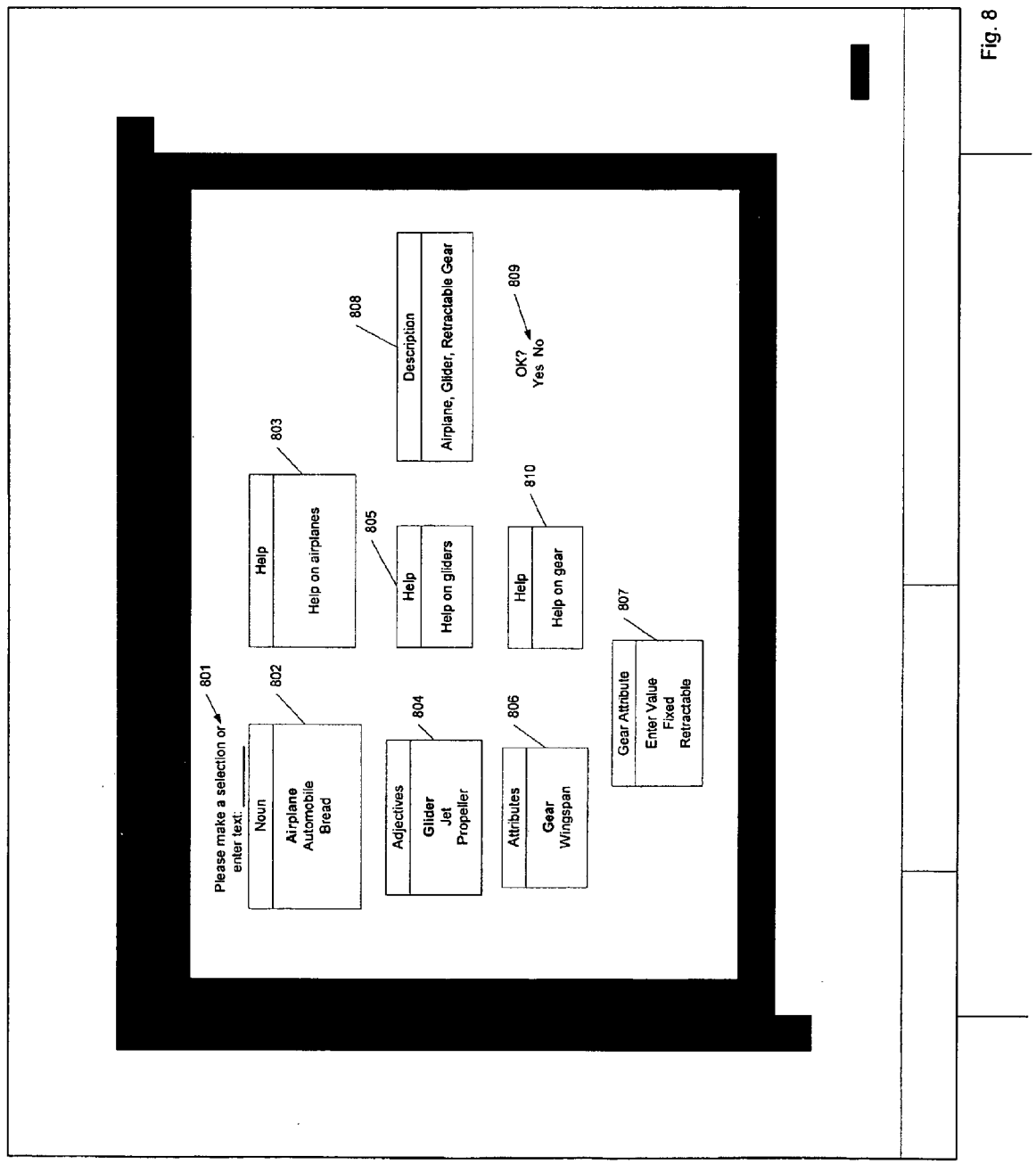
FIG. 8 is a depiction of an implementation of the instant system and method through a Graphical User Interface ("GUI") system.

A sample display screen depicting the appearance of the instant invention to the user when the user is provided listings from which to chose is demonstrated with reference to FIG. 8. The screen comprises a prompt 801 for the user to select an item off of the noun list 802 or to enter text which may be parsed to generate a narrower noun list 802 or definitively select items of the specification. As previously mentioned, the list 802 may represent all available nouns. By way of example, several nouns are listed 802.

As the user scrolls through the noun list 802, guideline help 803 is provided to inform the user as to what items are included in and excluded from the definitions of the items on the list 802. The guideline help 803 may be context sensitive, so that when an item is highlighted on the noun list 802, such as "Airplane" as illustrated, guideline help 803 is provided only for that noun.

Once a noun is selected from the noun list 802, an additional menu 804 is displayed having only the adjectives for the selected noun or a subset thereof, as suggested by direct user input from the initial prompt 801. Again, assistance 805 may be provided for each of the elements as it is highlighted from the list of adjectives 804. By way of example, "Glider" is shown as selected, and the help box 805 accordingly provides help regarding gliders.

Upon selection of an adjective from the adjective list 804, a series of attributes 806 may be displayed in a similar manner. As with the adjectives, only those qualifying attributes are listed, and may be listed for the user by using the attribute labels. The user may be prompted 807 for direct entry of values for the attributes in the list 806, or such an entry may be made manually by selecting from a listing. One or more attributes may be selected from the attribute list 806.

Following entry of all the attributes 806 desired, the goods specification 808 is generated. The user may be given the opportunity 809 to accept or further modify the specification. It will be appreciated that the display of the goods specification 808 is optional and may be removed, the goods specification being directly output to any number of facilities, as described herein.

Though the diagram as shown on FIG. 8 demonstrates all of the boxes and menus as simultaneously displayed, those skilled in the art will appreciate that the figure is shown as such for illustrative purposes only. In a preferred embodiment of the invention, the interface presented may be an interactive one in which the menus and boxes appear and disappear at appropriate times. Likewise, the format and positioning of the boxes and menus (and, in fact, their very existence as "boxes") may be modified, all falling within the metes and bounds of the invention described.

Those skilled in the art will readily appreciate that the description system described in detail herein may be used not only any time goods are to be described but may also be easily adapted to provide a description facility for services. In such a case, the system is configured to reference verbs/adverbs/attributes rather than nouns/adjectives/attributes. Similarly, the system may be adapted to describe any other item requiring identification. However, in any event, the operation of the system is identical.

It should be noted that the instant invention may be used to provide descriptions for submissions to databases, as well as to compose queries for searches to locate entries in databases. Those skilled in the art will recognize that when the instant system is used for both submissions and queries, efficiency will be maximized.

Those skilled in the art will also readily appreciate that the instant invention may be used to provide database construction and search criteria formation assistance to persons of different cultures and languages. In such a case, again with reference to FIG. 2, the dictionary database 210 may include additional entry fields for nouns, adjectives and attributes (labels and values) in a second language. Such additional fields are linked to the corresponding term in the first language and, by extensions, to the help and dictionary information. Alternatively, such help and dictionary information may be provided in the send language in additional databases or fields. The user interface 208 may be adapted to read the noun and its local representation and explanation from the dictionary database 210. Accordingly, in generating the listing string 212, the user interface 208 may use the native language of the user or may use a uniform first language (such as English) out of the linked references within the first fields of the dictionary database 210. In this way, the invention is easily adapted to provide a translation service to users so that all entries within a database (or all searches made upon a database) are uniform and more efficient.

As to the specific manner of operation and use of the present invention, the same is made apparent from the foregoing discussion. However, for the sake of clarity, several key applications of the invention are highlighted. The foregoing invention includes applications in on-line auctions, on-line reverse-auctions, on-line and local computerized goods sales, on-line and local goods and services ordering, on-line and local search engines, inventory control systems, customer assistance softwares, computerized telephone directory services, point of sale systems, computerized translation services, database systems, advertisement publication, including classified advertisement publication, Internet web site authoring, and the like.

With respect to the above description, it is to be realized that although embodiment of specific material, representations, iterations, applications, networks and languages are disclosed, those enabling embodiments are illustrative and the optimum relationships for the parts of the invention may include variations in composition, form, protocols, function, and manner of operation, which are deemed readily apparent to one skilled in the art in view of this disclosure. All relevant relationships to those illustrated in the drawings and the specification are intended to be encompassed by the present invention.

Therefore, the foregoing is considered as illustrative of the principles of the invention. Numerous modifications will readily occur to those skilled in the art. It is not desired to limit the invention to the exact construction and operation shown or described, and all suitable modifications and equivalence may be resorted to, falling within the scope of the invention.

What is claimed is:

1. A method for specifying using a data processing system comprising the steps of:
    reading a first list of nouns from a dictionary database;
    attempting to match a set of user input to the first list to select a first element, the first element being a noun;
    if a definitive match is not made, displaying a list of possible first elements from the first list and permitting selection of a member of the possible first elements list;
    reading a second list of adjectives from the dictionary database based upon the selected first element;
    attempting to match the set of user input to the second list to select a second element, the second element being an adjective;
    if a definitive match is not made, displaying a list of possible second elements from the second list and permitting selection of a member of the possible second element list;
    reading a third list of attributes from the dictionary database based upon the selected first element and the selected second element;
    attempting to match the set of user input to the third list to select a set of third elements and corresponding third element values, the third elements being attributes;
    if a definitive match is not made, displaying a list of possible third elements from the third list and permitting selection of a set of third elements of the possible third element list and entry of corresponding third element values; and
    composing a specification from the selected member of the first list, the selected member of the second list, and the selected set of third elements and corresponding third element values.

2. The method of claim 1 wherein the first list is mutually-exclusive.

3. The method of claim 1 wherein the second list is mutually-exclusive.

4. The method of claim 3 wherein the first list is mutually-exclusive.

5. The method of claim 4 wherein the data processing system is configured to access a local search engine.

6. The method of claim 1 further comprising the steps of:
    determining appropriate first synonyms for the first element; and
    adding the first synonyms to the specification.

7. The method of claim 1 further comprising the steps of:
    determining appropriate first synonyms for the second element; and
    adding the second synonyms to the specification.

8. The method of claim 1 further comprising the steps of:
    determining appropriate third synonyms for an element of the set of third elements; and
    adding the third synonyms to the specification.

9. The method of claim 1 wherein the step of attempting to match the user input to the first list is accomplished with further reference to external factors.

10. The method of claim 1 further comprising the steps of:
    permitting the user to elect entry of a freeform specification;
    accepting entry of a freeform specification; and
    composing the specification from the freeform specification.

11. The method of claim 1 wherein each attribute comprises a value.

12. The method of claim 11 wherein each attribute further comprises a label.

13. The method of claim 1 comprising the additional step of writing the specification to a listing database.

14. The method of claim 13 comprising the additional step of passing the specification to a server.

15. The method of claim 14 wherein the specification is passed in a different language from that utilized uring the other steps in the method.

16. The method of claim 13 wherein the specification is used to add to the listing database a description of the element.

17. The method of claim 1 wherein the specification is used to compose a query to locate a certain element the database.

18. The method of claim 1 wherein the specification is composed in a different language from that utilized during the other steps in the method.

19. The method of claim 18 wherein the data processing system is configured to access a computerized translation service.

20. The method of claim 18 wherein the data processing system comprises a computerized translation service.

21. The method of claim 1 wherein the data processing system is configured to access a sales system.

22. The method of claim 1 wherein the data processing system is configured to access a system to facilitate goods sales.

23. The method of claim 1 wherein the data processing system is configured to access a search engine.

24. The method of claim 1 wherein the data processing system is configured to access an inventory control system.

25. The method of claim 1 wherein the data processing system is configured to access a customer assistance system.

26. The method of claim 1 wherein the data processing system is configured to access a computerized telephone directory service.

27. A method for specifying using a data processing system comprising the steps of:

reading a first list of nouns from a dictionary database, wherein the first list is mutually-exclusive;

attempting to match a set of user input to the first list to select a first element, the first element being a noun;

if a definitive match is not made, displaying a list of possible first elements from the first list and permitting selection of a member of the possible first elements list;

reading a second list of adjectives from the dictionary database based upon the selected first element wherein the second list is mutually-exclusive;

attempting to match the set of user input to the second list to select a second element, the second element being an adjective;

if a definitive match is not made, displaying a list of possible second elements from the second list and permitting selection of a member of the possible second element list;

reading a third list of attributes from the dictionary database based upon the selected first element and the selected second element;

attempting to match the set of user input to the third list to select a set of third elements and corresponding third element values, the third elements being attributes;

if a definitive match is not made, displaying a list of possible third elements from the third list and permitting selection of a set of third elements of the possible third element list and entry of corresponding third element values;

composing a specification from the selected member of the first list, the selected member of the second list, and the selected set of third elements and corresponding third element values;

determining appropriate first synonyms for the first element;

adding the first synonyms to the specification;

determining appropriate first synonyms for the second element;

adding the second synonyms to the specification;

determining appropriate third synonyms for an element of the set of third elements; and adding the third synonyms to the specification.

28. The method of claim 27 further comprising the steps of:

permitting the user to elect entry of a freeform specification;

accepting entry of a freeform specification; and composing the specification from the freeform specification.

29. The method of claim 27 wherein each attribute comprises a value.

30. The method of claim 29 wherein each attribute further comprises a label.

31. A method for specifying using a data processing system comprising the steps of:

reading a first list of verbs from a dictionary database;

attempting to match a set of user input to the first list to select a first element, the first element being a verb;

if a definitive match is not made, displaying a list of possible first elements from the first list and permitting selection of a member of the possible first elements list;

reading a second list of adverbs from the dictionary database based upon the selected first element;

attempting to match the set of user input to the second list to select a second element, the second element being an adverb;

if a definitive match is not made, displaying a list of possible second elements from the second list and permitting selection of a member of the possible second element list;

reading a third list of attributes from the dictionary database based upon the selected first element and the selected second element;

attempting to match the set of user input to the third list to select a set of third elements and corresponding third element values, the third elements being attributes;

if a definitive match is not made, displaying a list of possible third elements from the third list and permitting selection of a set of third elements of the possible third element list and entry of corresponding third element values;

composing a specification of services from the selected member of the first list, the selected member of the second list, and the selected set of third elements and corresponding third element values.

32. The method of claim 31 wherein the first list is mutually-exclusive.

33. The method of claim 31 wherein the second list is mutually-exclusive.

34. The method of claim 33 wherein the first list is mutually-exclusive.

35. The method of claim 34 wherein data processing system is configured to access a local search engine.

36. The method of claim 31 further comprising the steps of:

determining appropriate first synonyms for the first element; and adding the first synonyms to the specification.

37. The method of claim 31 further comprising the steps of:

determining appropriate first synonyms for the second element; and adding the second synonyms to the specification.

38. The method of claim 31 further comprising the steps of:

determining appropriate third synonyms for an element of the set of third elements; and adding the third synonyms to the specification.

39. The method of claim 31 wherein the step of attempting to match the user input to the first list is accomplished with further reference to external factors.

40. The method of claim 31 further comprising the steps of:

permitting the user to elect entry of a freeform specification;

accepting entry of a freeform specification; and composing the specification from the freeform specification.

41. The method of claim 31 wherein each attribute comprises a value.

42. The method of claim 31 wherein each attribute further comprises a label.

43. The method of claim 31 comprising the additional step of writing the specification to a listing database.

44. The method of claim 43 comprising the additional step of passing the specification to a server.

45. The method of claim 44 wherein the specification is passed in a different language from that utilized during the other steps in the method.

46. The method of claim 43 wherein the specification is used to add to the listing database a description of the element.

47. The method of claim 31 wherein the specification is used to compose a query to locate a certain element the database.

48. The method of claim 31 wherein the specification is composed in a different language from that utilized during the other steps in the method.

49. The method of claim 48 wherein the data processing system is configured to access a computerized translation service.

50. The method of claim 48 wherein the data processing system comprises a computerized translation service.

51. The method of claim 31 wherein the data processing system is configured to access a sales system.

52. The method of claim 31 wherein the data processing system is configured to facilitate the ordering of services.

53. The method of claim 31 wherein the data processing system is configured to access a search engine.

54. The method of claim 31 wherein the data processing system is configured to access a customer assistance system.

55. The method of claim 31 wherein the data processing system is configured to access a computerized telephone directory service.

56. A method for specifying using a data processing system comprising the steps of:
    reading a first list of verbs from a dictionary database, wherein the first list is mutually-exclusive;
    attempting to match a set of user input to the first list to select a first element, the first element being a verb;
    if a definitive match is not made, displaying a list of possible first elements from the first list and permitting selection of a member of the possible first elements list;
    reading a second list of adverbs from the dictionary database based upon the selected first element, wherein the second list is mutually exclusive;
    attempting to match the set of user input to the second list to select a second element, the second element being an adverb;
    if a definitive match is not made, displaying a list of possible second elements from the second list and permitting selection of a member of the possible second element list;
    reading a third list of attributes from the dictionary database based upon the selected first element and the selected second element;
    attempting to match the set of user input to the third list to select a set of third elements and corresponding third element values, the third elements being attributes;
    if a definitive match is not made, displaying a list of possible third elements from the third list and permitting selection of a set of third elements of the possible third element list and entry of corresponding third element values;
    composing a specification of services from the selected member of the first list, the selected member of the second list, and the selected set of third elements and corresponding third element values;
    determining appropriate first synonyms for the first element;
    adding the first synonyms to the specification;
    determining appropriate first synonyms for the second element;
    adding the second synonyms to the specification;
    determining appropriate third synonyms for an element of the set of third elements; and
    adding the third synonyms to the specification.

57. The method of claim 56 further comprising the steps of:
    permitting the user to elect entry of a freeform specification;
    accepting entry of a freeform specification; and
    composing the specification from the freeform specification.

58. The method of claim 56 wherein each attribute comprises a value.

59. The method of claim 58 wherein each attribute further comprises a label.

60. A computer program product in a computer-readable medium adapted to specifying using a data processing system, the computer program product comprising:
    a first list reading code comprising a set of codes operable to direct the data processing system to read a first list of nouns from a dictionary database;
    a first matching code comprising a set of codes operable to direct the data processing system to attempt to match a set of user input to the first list to select a first element, wherein the first element is a noun;
    a first element selection code comprising a set of codes operable to direct the data processing system to display a list of possible first elements from the first list and permit selection of a member of the first list if a definitive match is not made by the first matching code;
    a second list reading code comprising a set of codes operable to direct the data processing system to read a second list of adjectives from the dictionary database based upon the selected first element;
    a second matching code comprising a set of codes operable to direct the data processing system to attempt to match the set of user input to the second list to select a second element, wherein the second element is an adjective;
    a second element selection code comprising a set of codes operable to direct the data processing system to display a list of possible second elements from the second list and permit selection of a member of the second list if a definitive match is not made by the second matching code;
    a third list reading code comprising a set of codes operable to direct the data processing system to read a third list of attributes from the dictionary database based upon the selected first element and the selected second element;
    a third matching code comprising a set of codes operable to direct the data processing system to attempt to match the set of user input to the third list to select a set of third elements and corresponding third element values, wherein the third elements are attributes;
    a third element selection code comprising a set of codes operable to direct the data processing system to display a list of possible third elements from the third list and permit selection of a set of third elements and entry of corresponding third element values if a definitive match is not made by the third matching code;
    a composition code comprising a set of codes operable to direct the data processing system to compose a specification of a good from the first element, the second element, and the set of third elements and corresponding values.

61. The method of claim 60 wherein the first list is mutually-exclusive.

62. The method of claim 60 wherein the second list is mutually-exclusive.

63. The method of claim 62 wherein the first list is mutually-exclusive.

64. The computer program product of claim 60 further comprising:
   a specification writing code comprising a set of codes operable to direct the data processing system to write the specification to a listing database.

65. The computer program product of claim 60 further comprising:
   a specification passing code comprising a set of codes operable to direct the data processing system to passing the specification to a server.

66. The computer program product of claim 65 wherein the specification passing code further comprises codes operable to direct the data processing system to pass to the specification in a different language from that used by the user to select the first element, the second element and the set of third elements and corresponding values.

67. The computer program product of claim 60 wherein specification is suitable to be used to add a description of the good to a database.

68. The computer program product of claim 60 wherein the specification is suitable to be used to locate a description of a good within a database.

69. The computer program product of claim 60 wherein the composition code further comprises codes to direct the data processing system to compose the specification in a different language from that previously used by the user to select the first element, the second element and the set of third elements and corresponding values.

70. A computer program product in a computer-readable medium adapted to specifying using a data processing system, the computer program product comprising:
   a first list reading code comprising a set of codes operable to direct the data processing system to read a first list of verbs from a dictionary database;
   a first matching code comprising a set of codes operable to direct the data processing system to attempt to match a set of user input to the first list to select a first element, wherein the first element is a verb;
   a first element selection code comprising a set of codes operable to direct the data processing system to display a list of possible first elements from the first list and permit selection of a member of the first list if a definitive match is not made by the first matching code;
   a second list reading code comprising a set of codes operable to direct the data processing system to read a second list of adverbs from the dictionary database based upon the selected first element;
   a second matching code comprising a set of codes operable to direct the data processing system to attempt to match the set of user input to the second list to select a second element, wherein the second element is an adverb;
   a second element selection code comprising a set of codes operable to direct the data processing system to display a list of possible second elements from the second list and permit selection of a member of the second list if a definitive match is not made by the second matching code;
   a third list reading code comprising a set of codes operable to direct the data processing system to read a third list of attributes from the dictionary database based upon the selected first element and the selected second element;
   a third matching code comprising a set of codes operable to direct the data processing system to attempt to match the set of user input to the third list to select a set of third elements and corresponding third element values, wherein the third elements are attributes;
   a third element selection code comprising a set of codes operable to direct the data processing system to display a list of possible third elements from the third list and permit selection of a set of third elements and entry of corresponding third element values if a definitive match is not made by the third matching code;
   a composition code comprising a set of codes operable to direct the data processing system to compose a specification of a good from the first element, the second element, and the set of third elements and corresponding values.

71. The method of claim 70 wherein the first list is mutually-exclusive.

72. The method of claim 70 wherein the second list is mutually-exclusive.

73. The method of claim 72 wherein the first list is mutually-exclusive.

74. The computer program product of claim 70 further comprising:
   a specification writing code comprising a set of codes operable to direct the data processing system to write the specification to a listing database.

75. The computer program product of claim 70 further comprising:
   a specification passing code comprising a set of codes operable to direct the data processing system to passing the specification to a server.

76. The computer program product of claim 75 wherein the specification passing code further comprises codes operable to direct the data processing system to pass to the specification in a different language from that used by the user to select the first element, the second element and the set of third elements and corresponding values.

77. The computer program product of claim 70 wherein the specification is suitable to be used to add a description of the good to a database.

78. The computer program product of claim 70 wherein specification is suitable to be used to locate a description of a good within a database.

79. The computer program product of claim 70 wherein the composition code further comprises codes to direct the data processing system to compose the specification in a different language from that previously used by the user to select the first element, the second element and the set of third elements and corresponding values.

80. A method of doing business providing the service of specifying using a data processing system, the method of business comprising the steps of:
   reading a first list of nouns from a dictionary database;
   attempting to match a set of user input to the first list to select a first element, wherein the first element is a noun;
   if a definitive match is not made, displaying a list of possible first elements from the first list and permitting selection of a member of the possible first elements list;
   reading a second list of adjectives from the dictionary database based upon the selected first element;
   attempting to match the set of user input to the second list to select a second element, wherein the second element is an adjective;
   if a definitive match is not made, displaying a list of possible second elements from the second list and permitting selection of a member of the possible second element list;

reading a third list of attributes from the dictionary database based upon the selected first element and the selected second element;

attempting to match the set of user input to the third list to select a set of third elements and corresponding values, wherein the third elements are attributes;

if a definitive match is not made, displaying a list of possible third elements from the third list and permitting selection of a set of third elements and entry of corresponding values;

composing a specification of a service from the selected first element, the selected second element, and the selected set of third elements and corresponding values; and receiving revenues.

81. The method of doing business of claim 80 further comprising the step of charging a user for the service of specifying.

82. The method of doing business of claim 80 further comprising the step of charging an advertiser for the right to display an advertisement to the user of the service of specifying.

83. The method of doing business of claim 80 comprising the additional step of writing the specification to a listing database.

84. The method of doing business of claim 83 comprising the additional step of passing the specification to a server.

85. The method of doing business of claim 84 wherein the specification is passed in a different language from that subsequently displayed.

86. The method of doing business of claim 83 wherein the specification is written in a different language from that subsequently displayed.

87. The method of claim 80 wherein the first list is mutually-exclusive.

88. The method of claim 80 wherein the second list is mutually-exclusive.

89. The method of claim 88 wherein the first list is mutually-exclusive.

90. A method of doing business providing the service of specifying using a data processing system, the method of business comprising the steps of:

reading a first list of verbs from a dictionary database;

attempting to match a set of user input to the first list to select a first element, wherein the first element is a verb;

if a definitive match is not made, displaying a list of possible first elements from the first list and permitting selection of a member of the possible first elements list;

reading a second list of adverbs from the dictionary database based upon the selected first element;

attempting to match the set of user input to the second list to select a second element, wherein the second element is an adverb;

if a definitive match is not made, displaying a list of possible second elements from the second list and permitting selection of a member of the possible second element list;

reading a third list of attributes from the dictionary database based upon the selected first element and the selected second element;

attempting to match the set of user input to the third list to select a set of third elements and corresponding values, wherein the third elements are attributes;

if a definitive match is not made, displaying a list of possible third elements from the third list and permitting selection of a set of third elements and entry of corresponding values;

composing a specification of a service from the selected first element, the selected second element, and the selected set of third elements and corresponding values; and receiving revenues.

91. The method of doing business of claim 90 further comprising the step of charging a user for the service of specifying.

92. The method of doing business of claim 90 further comprising the step of charging an advertiser for the right to display an advertisement to the user of the service of specifying.

93. The method of doing business of claim 90 comprising the additional step of writing the specification to a listing database.

94. The method of doing business of claim 93 comprising the additional step of passing the specification to a server.

95. The method of doing business of claim 94 wherein the specification is passed in a different language from that subsequently displayed.

96. The method of doing business of claim 93 wherein the specification is written in a different language from that subsequently displayed.

97. The method of claim 90 wherein the first list is mutually-exclusive.

98. The method of claim 90 wherein the second list is mutually-exclusive.

99. The method of claim 98 wherein the list is mutually-exclusive.

* * * * *